(12) United States Patent
Zhu et al.

(10) Patent No.: US 12,554,027 B2
(45) Date of Patent: Feb. 17, 2026

(54) TUNING METHOD FOR COLLIMATOR, CONTROLLER, COLLIMATOR AND CT MACHINE

(71) Applicant: Siemens Healthcare GmbH, Erlangen (DE)

(72) Inventors: Jia Peng Zhu, Shanghai (CN); Li Dong Zhang, Shanghai (CN); Jian Zhang, Shanghai (CN); Ji Feng Zhao, Shanghai (CN); Feng Hai Yu, Shanghai (CN)

(73) Assignee: Siemens Healthineers AG, Forchheim (DE)

( * ) Notice: Subject to any disclaimer, the term of this patent is extended or adjusted under 35 U.S.C. 154(b) by 256 days.

(21) Appl. No.: 18/243,747

(22) Filed: Sep. 8, 2023

(65) Prior Publication Data

US 2024/0085579 A1    Mar. 14, 2024

(30) Foreign Application Priority Data

Sep. 9, 2022   (CN) .......................... 202211104140.4

(51) Int. Cl.
 *G01T 1/29*  (2006.01)
 *G21K 1/04*  (2006.01)

(52) U.S. Cl.
 CPC .............. *G01T 1/295* (2013.01); *G21K 1/046* (2013.01)

(58) Field of Classification Search
 CPC . G01T 1/29; G01T 1/295; G21K 1/04; G21K 1/046; A61B 6/032; A61B 6/035; A61B 6/06; A61B 6/4021; A61B 6/4429; A61B 6/5258; H05G 1/52
 See application file for complete search history.

(56) References Cited

U.S. PATENT DOCUMENTS 4,991,189 A    2/1991   Boomgaarden et al.
8,331,527 B2   12/2012  Ishikawa et al.

FOREIGN PATENT DOCUMENTS

WO    2011068145 A1   6/2011

*Primary Examiner* — Jurie Yun
(74) *Attorney, Agent, or Firm* — Banner & Witcoff, Ltd.

(57) ABSTRACT

A tuning method for a collimator of a CT machine, which, in each cycle of X-ray scan operation and stop, may include determining whether an X-ray is generated from the anode plate; calculating the Z-direction heating displacement of the slot plate during the current scan based on a detected X-ray, driving the slot plate to move by the heating displacement in the Z-direction, calculating the total Z-direction heating displacement of the slot plate at the end of the current scan, calculating the cooling displacement of the slot plate during the current stop based on the stop time of the X-ray, and driving the slot plate to move.

18 Claims, 6 Drawing Sheets

FIG. 6 ions TUNING METHOD FOR COLLIMATOR, CONTROLLER, COLLIMATOR AND CT MACHINE

CROSS REFERENCE TO RELATED APPLICATIONS

This patent application claims priority to Chinese Patent Application No. 202211104140.4, filed Sep. 9, 2022, which is incorporated herein by reference in its entirety.

BACKGROUND

Technical Field

The present disclosure relates to a tuning method for a collimator of a CT machine, in particular to a tuning method for a collimator of a CT machine, a controller for a collimator, a collimator, and a CT machine.

Related Art

In computed tomography (CT), instability of focal positions of an X-ray tube may lead to a decrease in image quality and even result in image artifacts. Focus shifts are mainly caused by the thermal conditions of an X-ray tube.

Conventionally, during a scan, the anode plate of the X-ray tube expands when heated, and the focal position moves in one direction along the Z-axis; when the scan has stopped, as the temperature decreases, the anode plate of the X-ray tube will be turned around and move in the opposite direction. This phenomenon is particularly evident in the Z-direction of the tube, and if no corrective measures are taken, an X-ray having passed through the collimator (TCO) will deviate from an effective detector area, which will result in a decrease in image quality. A CT machine may include an anode plate for generating X-rays. The collimator used for the CT machine may include a slot plate. When the anode plate expands due to heat, the focal position may move in one direction along the Z-axis to, so when the scan target on the scanning table is scanned, the X-ray will have displacements.

To address this problem, thermal Z-control is the most commonly used to compensate for focus shift. With this method, real-time data obtained by the detector are used, and the distance to be covered by the slot plate is calculated to ensure that the X-ray remains within an effective area of the scan target.

Figure 1:
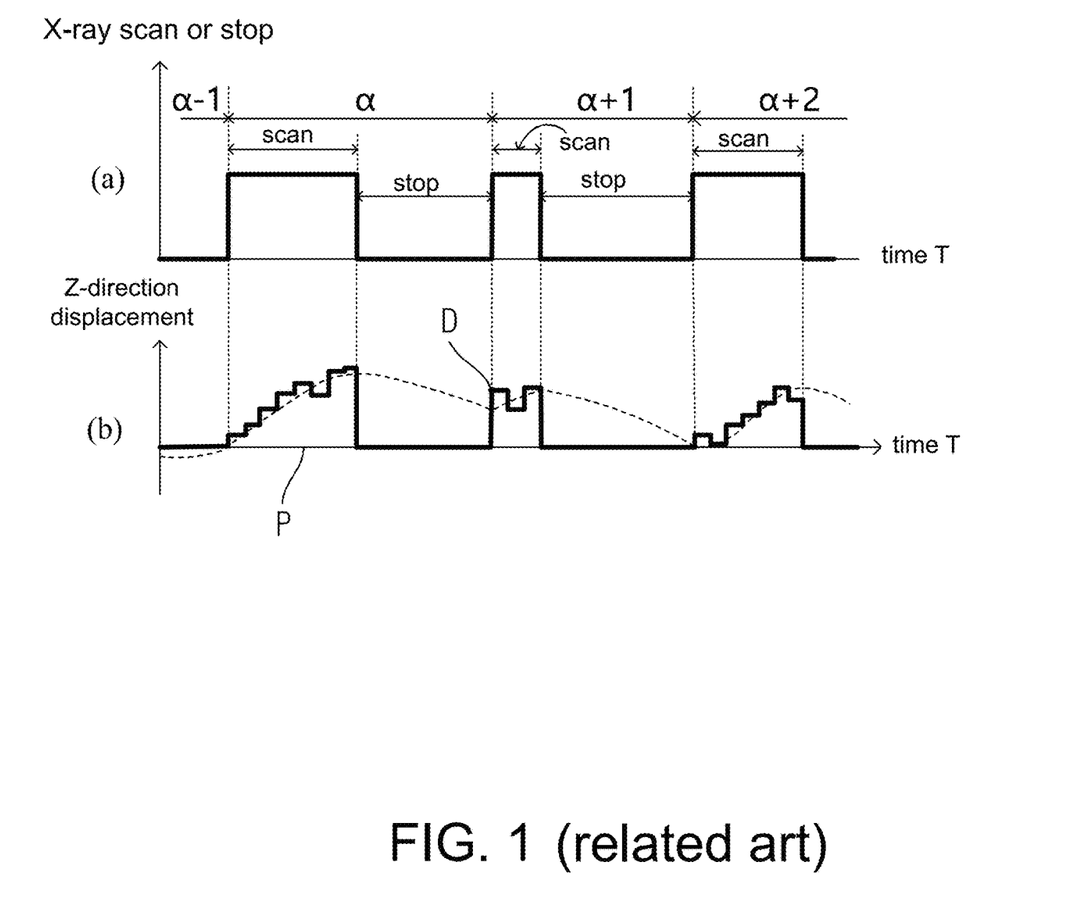
FIG. 1 shows the changes in the Z-direction displacement over time according to a conventional method for compensating for the focus shift.

As shown in FIG. 1, the Z-direction displacement of segment P represents the Z-direction displacement of the slot plate during a scan, and since no X-ray is emitted during the scan stop period from the closing of the previous scan till the start of the next scan, thermal Z-control cannot be performed. Therefore, when a scan has stopped, the Z-direction displacement of the slot plate is within the scan stop period, and the slot plate has no displacement. When the next scan starts, the actual focus position has substantially deviated from the slot plate position, which results in a decrease in image quality at the beginning of the scan.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An objective of the present disclosure is to provide a tuning method for a collimator of a CT machine, which makes it possible to control the displacement of the slot plate during the scan stop stage, thereby improving the image scan quality of the CT machine.

Figure 2:
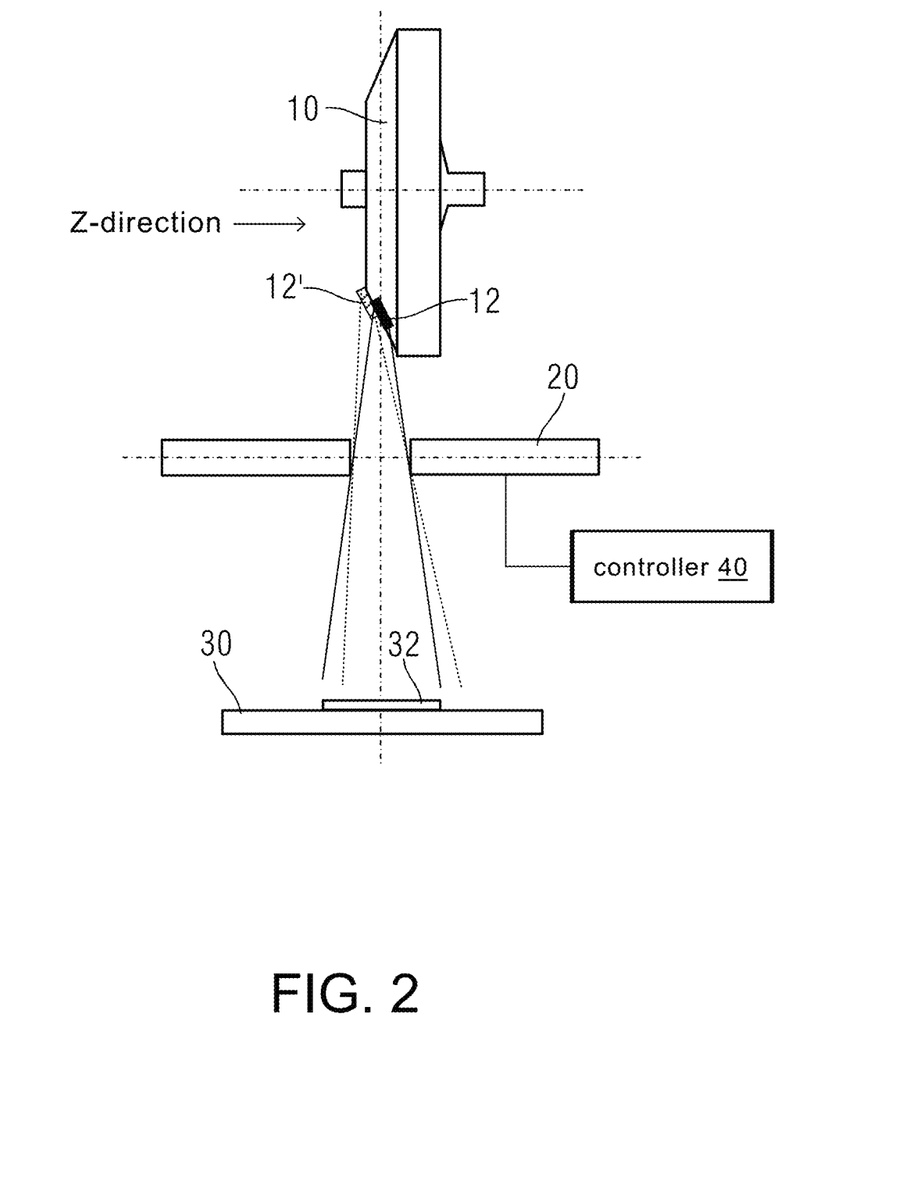
FIG. 2 is a schematic diagram of a CT machine having an anode plate and collimator according to an exemplary embodiment of the present disclosure.

The present disclosure provides a collimator for a CT machine. As shown in FIG. 2, the CT machine may comprise an anode plate 10 for generating X-rays. The collimator used for the CT machine may comprises a slot plate 20 and a controller 40. Aspects of the present disclosure, as discussed in more detail below, address displacement of the slot plate 20 that may result from expansion of the anode plate 10 due to heat. Such displacement may cause the focal position 12 to move in one direction along the Z-axis to 12'. Aspects of the present disclosure help reduce and/or compensate for displacements of the X-ray when the scan target 32 on the scanning table 30 is scanned. In an exemplary embodiment, the controller 40 includes processing circuitry that is configured to perform one or more functions of the controller 40, which may include performing one or more tuning methods of the present disclosure.

In an exemplary embodiment, the tuning method for a collimator of a CT machine, which, in each cycle of an X-ray scan operation and a stop, may comprise: a detection step of determining whether an X-ray is generated from the anode plate; if an X-ray is detected in the detection step, the controller calculates the Z-direction heating displacement $\Delta z_{Thermal}^{(\alpha)}$ of the slot plate during the current scan, wherein $\alpha$ indicates the current cycle; the controller drives the slot plate to move by the heating displacement in the Z-direction; if no X-ray is detected in the detection step, the controller calculates the total Z-direction heating displacement $z_{Thermal}^{(\alpha)}$ of the slot plate at the end of the current scan; the controller, on the basis of the stop time of the X-ray, calculates the cooling displacement $z_{Thermal}^{(\alpha)}$ of the slot plate during the current stop; and the controller drives the slot plate to move.

With the tuning method for a collimator of a CT machine provided by the present disclosure, by "learning control", the slot plate can, on the basis of the total displacement of the previous scan and the stop time, control the displacement of the slot plate during the scan stop stage, thereby minimizing the substantial jitter of the slot plate at the beginning and at the end of a scan, which, in turn, reduces risks of image quality degradation.

In an illustrated embodiment of the tuning method for a collimator of a CT machine, the cooling displacement $z_{Thermal}^{(\alpha)}$ at the time of the current stop is the difference between the total heating displacement $z_{Thermal}^{(\alpha)}$ of the current scan and $f(\Delta T_\alpha)$, a function of the current stop time $\Delta T\alpha$, namely $\Delta z_{Thermal}^{(\alpha)}=z_{Thermal}^{(\alpha)}-f(\Delta T_\alpha)$. Thus, a linear model may be used to estimate the cooling displacement generated at the time when a scan is performed again after cooling following a scan stop.

In another schematic embodiment of the tuning method for a collimator of a CT machine, $f(\Delta T_\alpha)$, a function of the current stop time, is a linear function, namely:

$f(\Delta T_\alpha)=\kappa \cdot \Delta T_\alpha$, wherein $\kappa$ is the thermal coefficient of the anode plate. During the scan stop $\Delta T$, the X-ray tube cools down because no scan is performed. Therefore, the focal position keeps drifting in a direction opposite to a heating direction. Therefore, a linear equation in units of time $\Delta T$ is established to estimate the required slot plate position before the next scan.

In another illustrated embodiment of the tuning method for a collimator of a CT machine, the method, in each cycle of an X-ray scan operation and a stop, further comprises a step of comparing the cooling displacement $z_{Thermal}^{(\alpha)}$ at the current stop with a predetermined cooling position $Z_{min}$ of the slot plate; if the cooling displacement $z_{Thermal}^{(\alpha)}$ is not smaller than the predetermined cooling position $Z_{min}$, the controller drives the slot plate to move by the cooling displacement $z_{Thermal}^{(\alpha)}$; if the cooling displacement $z_{Thermal}^{(\alpha)}$ is smaller than the predetermined cooling position $Z_{min}$, the controller drives the slot plate to move by the predetermined cooling position $Z_{min}$. When the calculated slot plate displacement exceeds a predetermined value, the displacement is a linear change, and when the calculated slot plate displacement is smaller than a predetermined value, the slot plate is displaced by the predetermined value.

In another illustrated embodiment of the tuning method for a collimator of a CT machine, the total heating displacement $z_{Thermal}^{(\alpha)}$ of the current scan is the sum of the total cooling displacement $z_{Thermal}^{(\alpha-1)}$ of the previous scan and the heating displacement $z_{Thermal}^{(\alpha)}$ of the current scan, namely $z_{Thermal}^{(\alpha)}=z_{Thermal}^{(\alpha-1)}+\Delta z_{Thermal}^{(\alpha)}$.

In another illustrated embodiment of the tuning method for a collimator of a CT machine, the heating displacement $\Delta z_{Thermal}^{(\alpha)}$ of the current scan is the sum of the displacements in the successive movements made by the slot plate during the current scan, namely $\Delta z_{Thermal}^{(\alpha)}=\Sigma_{i=1}^{i=n}\Delta z_i^{(\alpha)}$, wherein n is the total number of slot plate movements during the current scan. Therefore, $\Delta z_{Thermal}^{(\alpha)}$ may also be expressed as $z_{Thermal}^{(\alpha)}=z_{Thermal}^{(\alpha-1)}+\Delta z_{Thermal}^{(\alpha)}=z_{Thermal}^{(\alpha-1)}+\Delta z_1^{(\alpha)}+\Delta z_2^{(\alpha)}+ \ldots +\Delta z_{Thermal}^{(\alpha-1)}+\Sigma_{i=1}^{i=n}\Delta z_i^{(\alpha)}$. Therefore, the heating displacement during a scan may change by a gradient.

In another illustrated embodiment of the tuning method for a collimator of a CT machine, $f(\Delta T_\alpha)$, a function of the current stop time, is a linear function, namely: $f(\Delta T_\alpha)=\kappa \cdot \Delta T_\alpha$, wherein $\kappa$ is the thermal coefficient of the anode plate. Therefore, the heating displacement during a scan may change linearly.

In another illustrated embodiment of the tuning method for a collimator of a CT machine, the method, in each cycle of an X-ray scan operation and a stop, further comprises a step of comparing the calculated heating displacement $z_{Thermal}^{(\alpha)}$ of the current scanning with a predetermined heating displacement $Z_{max}$ of the slot plate; if the calculated heating displacement $z_{Thermal}^{(\alpha)}$ is not greater than the predetermined heating displacement $Z_{max}$, the controller drives the slot plate to move by the heating displacement $z_{Thermal}^{(\alpha)}$; if the calculated heating displacement $z_{Thermal}^{(\alpha)}$ is greater than the predetermined heating displacement $Z_{max}$, the controller drives the slot plate to move by the predetermined heating displacement $Z_{max}$. During a scan, the anode plate is heated, wherein, when the calculated slot plate displacement does not exceed a predetermined value, the displacement changes linearly, and when the calculated slot plate displacement is greater than a predetermined value, the slot plate is displaced by the predetermined value.

The present disclosure further provides a controller for a collimator of a CT machine, the controller comprising a control module for executing the above steps.

The present disclosure provides a collimator of a CT machine, the collimator comprising a slot plate and a controller as described above.

The present disclosure further provides a CT machine, which comprises a collimator as described above.

A controller, a collimator, and a CT machine provided by the present disclosure make it possible to, on the basis of the total displacement and stop time of the previous scan, control the displacement of the slot plate during the scan stop stage or simultaneously control the displacement of the slot plate during the scan stage, so that possibility of the slot plate undergoing any substantial jitter when the CT machine performs a scan or stops is minimized, thereby keeping the image quality stable.

Figure 3:
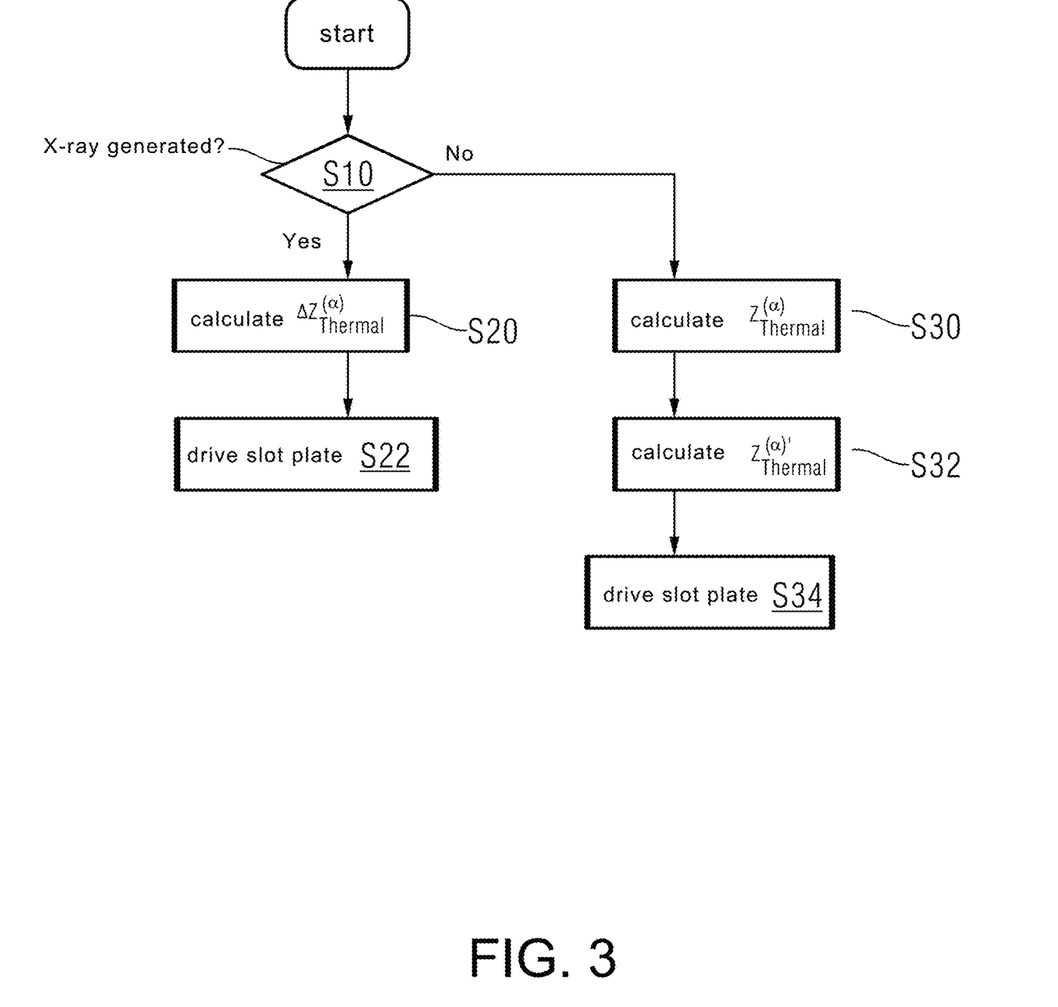
FIG. 3 shows a tuning method for a collimator of a CT machine according to an exemplary embodiment of the present disclosure.

FIG. 3 is an illustrated embodiment of the tuning method for a collimator of a CT machine. As shown in FIG. 3, the tuning method for a collimator of a CT machine, in each cycle of an X-ray scan operation and a stop, comprises the steps of:

S10: a detection step of determining whether an X-ray is generated from the anode plate;

S20: if an X-ray is detected in the detection step, the controller calculates the Z-direction heating displacement $\Delta z_{Thermal}^{(\alpha)}$ of the slot plate during the current scan, wherein $\alpha$ indicates the current cycle;

S22: the controller drives the slot plate to move by the heating displacement in the Z-direction;

S30: if no X-rays are detected in the detection step (S10), the controller calculates the total Z-direction heating displacement $z_{Thermal}^{(\alpha)}$ of the slot plate at the end of the current scan;

S32: the controller, on the basis of the stop time of the X-ray, calculates the cooling displacement $z_{Thermal}^{(\alpha)}$ of the slot plate during the current stop; and S34: the controller drives the slot plate to move.

Figure 4:
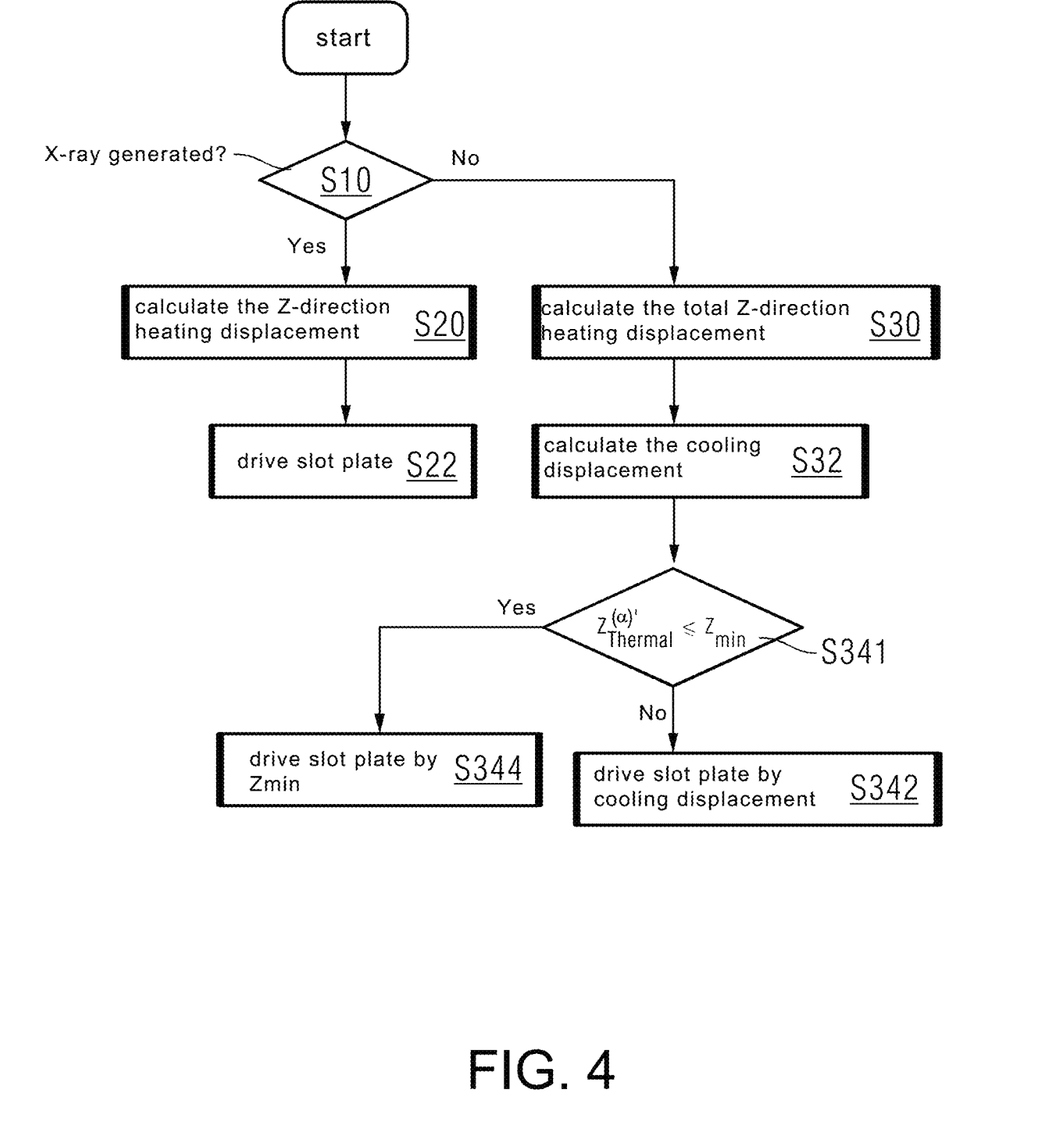
FIG. 4 shows a tuning method for a collimator of a CT machine according to an exemplary embodiment of the present disclosure.

FIG. 4 is an illustrated embodiment of the tuning method for a collimator of a CT machine. As shown in FIG. 4, the tuning method for a collimator of a CT machine, in each cycle of an X-ray scan operation and a stop, comprises the steps of:

S10: a detection step of determining whether an X-ray is generated from the anode plate;

S20: if an X-ray is detected in the detection step, the controller calculates the Z-direction heating displacement $\Delta z_{Thermal}^{(\alpha)}$ of the slot plate during the current scan, wherein a indicates the current cycle;

S22: the controller drives the slot plate to move by the heating displacement in the Z-direction;

S30: if no X-ray is detected in the detection step, the controller calculates the total Z-direction heating displacement $z_{Thermal}^{(\alpha)}$ of the slot plate at the end of the current scan; the total heating displacement $z_{Thermal}^{(\alpha)}$ of the current scan is the sum of the total cooling displacement $z_{Thermal}^{(\alpha-1)}$ of the previous scan and the heating displacement $\Delta z_{Thermal}^{(\alpha)}$ of the current scan, namely $z_{Thermal}^{(\alpha)} = z_{Thermal}^{(\alpha-1)} + \Delta z_{Thermal}^{(\alpha)}$, and the heating displacement $\Delta z_{Thermal}^{(\alpha)}$ of the current scan is the sum of the displacements in the successive movements made by the slot plate during the current scan, namely $\Delta z_{Thermal}^{(\alpha)} = \Sigma_{i=1}^{i=n} \Delta z_i^{(\alpha)}$, wherein n is the total number of slot plate movements during the current scan;

S32: the controller, on the basis of the stop time of the X-ray, calculates the cooling displacement $z_{Thermal}^{(\alpha)}$ of the slot plate during the current stop, wherein the cooling displacement $z_{Thermal}^{(\alpha)}$ at the time of the current stop is the difference between the total heating displacement $z_{Thermal}^{(\alpha)}$ of the current scan and $f(\Delta T_\alpha)$, a function of the current stop time $\Delta T_\alpha$, namely $z_{Thermal}^{(\alpha)} = z_{Thermal}^{(\alpha)} - f(\Delta T_\alpha)$, and $f(\Delta T_\alpha)$, a function of the current stop time, is a linear function, namely $f(\Delta T_\alpha) = \kappa \cdot \Delta T_\alpha$, wherein $\kappa$ is the thermal coefficient of the anode plate;

S341: compare the cooling displacement $z_{Thermal}^{(\alpha)}$ at the current stop with a predetermined cooling position $Z_{min}$ of the slot plate;

S342: if the cooling displacement $z_{Thermal}^{(\alpha)}$ is not smaller than the predetermined cooling position $Z_{min}$ (i.e., cooling displacement $z_{Thermal}^{(\alpha)}$ is greater than the predetermined cooling position $Z_{min}$), the controller drives the slot plate to move by the cooling displacement $z_{Thermal}^{(\alpha)}$;

S344: if the cooling displacement $z_{Thermal}^{(\alpha)}$ is smaller than the predetermined cooling position $Z_{min}$ (i.e., cooling displacement $z_{Thermal}^{(\alpha)}$ is less than or equal to the predetermined cooling position $Z_{min}$), the controller drives the slot plate to move by the predetermined cooling position $Z_{min}$.

Figure 5:
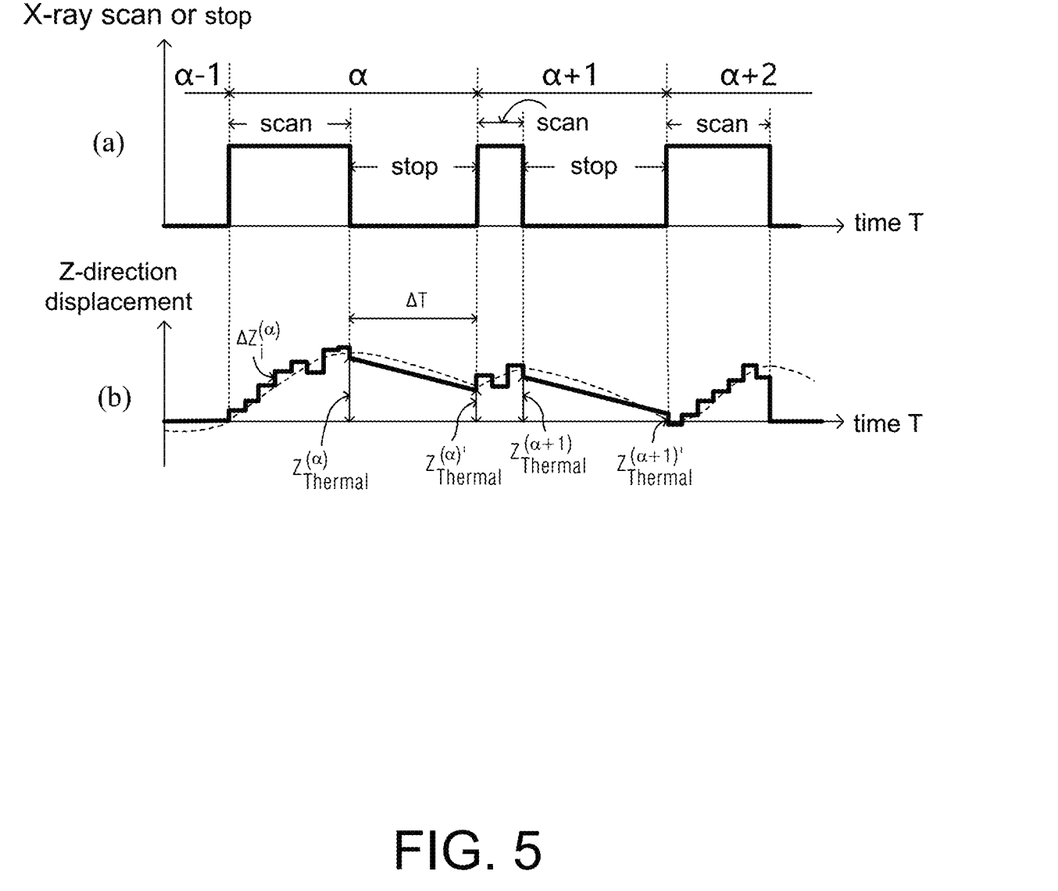
FIG. 5 show the changes in the Z-direction displacement over time according to the tuning method for a collimator of a CT machine shown in FIG. 3, according to an exemplary embodiment of the present disclosure.

FIG. 5 show the changes in the Z-direction displacement over time according to the tuning method for a collimator of a CT machine shown in FIG. 3. As shown in FIG. 5, part (a) shows the time of an X-ray scan or a stop. Part (b) is a graph of the changes in the Z-direction displacement over time. As shown in FIG. 5, during a scan stop, the controller, on the basis of the X-ray stop time, calculates the cooling displacement $z_{Thermal}^{(\alpha)}$ of the slot plate during the current stop, which is a linear displacement during the stop period $\Delta T$.

Figure 6:
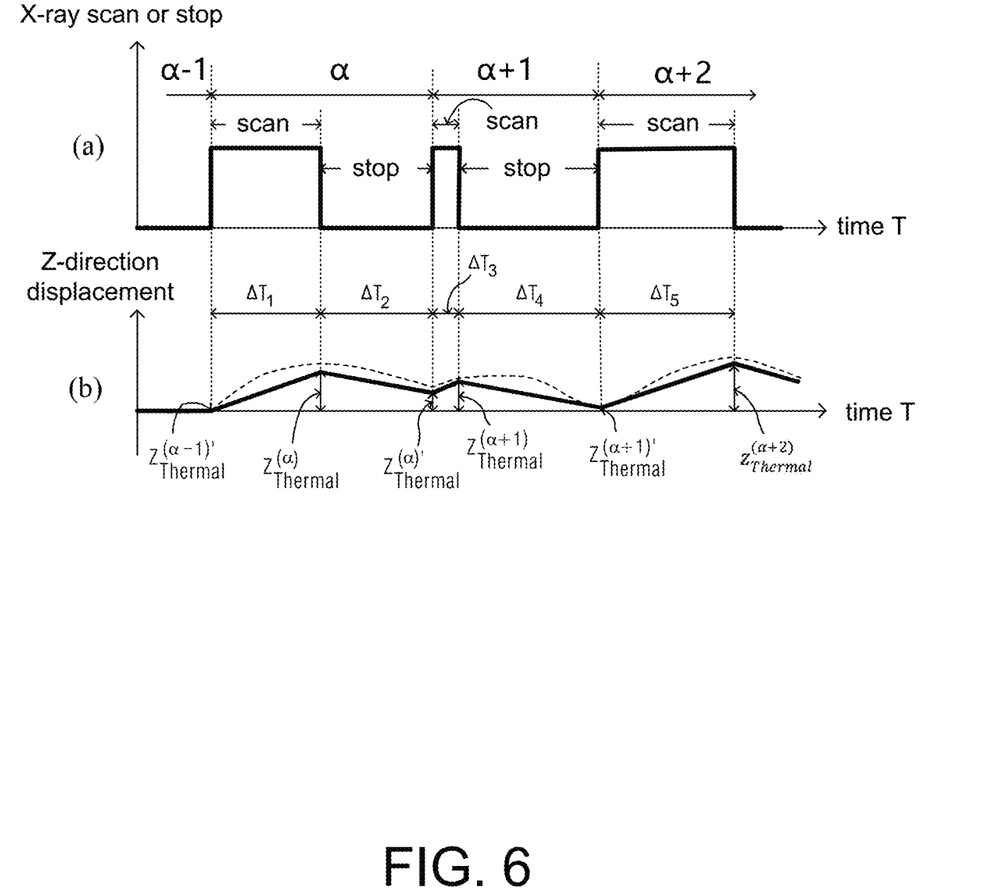
FIG. 6 show the changes in the Z-direction displacement over time according to the tuning method for a collimator of a CT machine shown in FIG. 4, according to an exemplary embodiment of the present disclosure.

FIG. 6 show the changes in the Z-direction displacement over time according to the tuning method for a collimator of a CT machine shown in FIG. 4. In step S30, the heating displacement $z_{Thermal}^{(\alpha)}$ of the current scan may be calculated by the controller on the basis of the thermal coefficient $\kappa_{H\alpha}$ of the current scan and the time $\Delta T_{H\alpha}$ of the current scan: $\Delta z_{Thermal}^{(\alpha)} = \kappa_{H\alpha} \cdot \Delta T_{H\alpha}$, wherein $\kappa_{H\alpha}$ is determined by a lookup table stored in the controller. FIG. 6 shows the changes in the Z-direction displacement over time according to the tuning method of this embodiment, wherein part (a) shows the time of an X-ray scan or a stop. Part (b) is a graph of the changes in the Z-direction displacement over time. As shown in FIG. 5, during a scan, the heating displacement $z_{Thermal}^{(\alpha)}$ is a linear displacement. During a scan stop, the controller, on the basis of the X-ray stop time, calculates the cooling displacement $z_{Thermal}^{(\alpha)}$ of the slot plate at the time of the current stop, which is a linear displacement during the stop period $\Delta T$.

The present disclosure further provides a controller for a collimator for a CT machine, the controller comprising a control module for executing the above steps.

The present disclosure provides a collimator for a CT machine, which comprises a slot plate for a collimator and a controller as described above.

The present disclosure further provides a CT machine, which comprises a collimator as described above.

A controller, a collimator, and a CT machine provided by the present disclosure make it possible to, on the basis of the total displacement and stop time of the previous scan, control the displacement of the slot plate during the scan stop stage or simultaneously control the displacement of the slot plate during the scan stage, so that possibility of the slot plate undergoing any substantial jitter when the CT machine performs a scan or stops is minimized, thereby keeping the image quality stable.

It should be understood that although the description herein is based on various embodiments, it is by no means the case that each embodiment contains just one independent technical solution. Such a method of presentation is adopted herein purely for the sake of clarity. Those skilled in the art should consider the description in its entirety. The technical solutions in the various embodiments could also be suitably combined to form other embodiments understandable to those skilled in the art.

The series of detailed explanations set out above are merely particular explanations of feasible embodiments of the present disclosure, which are not intended to limit the scope of protection thereof. All equivalent embodiments or changes made without departing from the artistic spirit of the present disclosure, such as combinations, divisions or repetitions of features, shall be included in the scope of protection of the present disclosure.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

The various components described herein may be referred to as "modules," "units," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such modules, units, or devices, as applicable and relevant, may alternatively be referred to herein as "circuitry," "controllers," "processors," or "processing circuitry," or alternatively as noted herein.

For the purposes of this discussion, the term "processing circuitry" shall be understood to be circuit(y) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The invention claimed is:

1. A tuning method for a collimator of a CT machine having an anode plate, the collimator having a slot plate, the tuning method comprising:

determining whether an X-ray is generated from the anode plate;

calculating, using a controller of the collimator, a Z-direction heating displacement amount to move the slot plate during a current scan based on a determination of the X-ray being generated;

driving, using the controller, the slot plate to move by the Z-direction heating displacement amount to compensate for displacement of the slot plate in a direction opposite to a Z-direction displacement amount as a result of thermal expansion of the anode plate;

calculating, using the controller and based on the determination of the X-ray being generated, a total Z-direction heating displacement of the slot plate at the end of the current scan;

calculating, via the controller and based on a stop time of the X-ray, a cooling displacement of the slot plate during a current stop stage by using a linear model that provides a linear relationship between a thermal coefficient of the anode plate and the stop time to predict the cooling displacement of the slot plate; and prior to a start of a subsequent scan, driving, using the controller and based on the calculated cooling displacement of the slot plate, the slot plate to move in a direction that is opposite to the Z-direction heating displacement amount.

2. The tuning method according to claim 1, wherein the cooling displacement at the time of the current stop stage is a difference between the total Z-direction heating displacement of the current scan and a function of the stop time.

3. The tuning method according to claim 2, wherein the cooling displacement is calculated based on:

$z_{Thermal}{}^{(\alpha)} = z_{Thermal}{}^{(\alpha)} - f(\Delta T_\alpha)$, wherein:

$z_{Thermal}{}^{(\alpha)}$ represents the cooling displacement, $z_{Thermal}{}^{(\alpha)}$ represents the total Z-direction heating displacement, $\Delta T_\alpha$ represents the stop time, $f(\Delta T_\alpha)$ represents a function of the stop time, and $\alpha$ represents a current cycle.

4. The tuning method according to claim 3, wherein the function of the stop time is:

$$f(\Delta T_\alpha) = \kappa \cdot \Delta T_\alpha,$$

wherein $\kappa$ represents a thermal coefficient of the anode plate and $\Delta T_\alpha$ represents the stop time.

5. The tuning method according to claim 1, wherein the tuning method, in each cycle of an X-ray scan operation and a stop stage, further comprises:
   comparing the cooling displacement of the slot plate at the current stop stage with a predetermined cooling position of the slot plate;
   driving, using the controller and in response to the cooling displacement of the slot plate being greater than the predetermined cooling position, the slot plate to move by the cooling displacement; and
   driving, using the controller and in response to the cooling displacement of the slot plate being less than or equal to the predetermined cooling position, the slot plate to move by the predetermined cooling position.

6. The tuning method according to claim 1, wherein the total heating displacement of the current scan is based on a total cooling displacement of a previous scan and the heating displacement of the current scan.

7. The tuning method according to claim 6, wherein the total heating displacement of the current scan is a sum of the total cooling displacement of the previous scan and the heating displacement of the current scan.

8. The tuning method according to claim 7, wherein the total heating displacement of the current scan is calculated, by the controller, based on a thermal coefficient of the current scan and the current scanning time.

9. The tuning method according to claim 8, wherein the total heating displacement of the current scan is a product of the thermal coefficient of the current scan and the current scanning time.

10. The tuning method according to claim 8, wherein the tuning method, in each cycle of an X-ray scan operation and a stop stage, further comprises:
   comparing, using the controller, the calculated Z-direction heating displacement amount of the slot plate for the current scan with a predetermined Z-direction heating displacement amount of the slot plate;
   driving, using the controller and in response to the calculated Z-direction heating displacement amount being less than or equal to the predetermined Z-direction heating displacement amount, the slot plate to move by the Z-direction heating displacement amount; and
   driving, using the controller and in response to the calculated Z-direction heating displacement amount being greater than the predetermined Z-direction heating displacement amount, the slot plate to move by the predetermined Z-direction heating displacement amount.

11. The tuning method according to claim 6, wherein the total heating displacement of the current scan is based on displacements in successive movements made by the slot plate during the current scan.

12. The tuning method according to claim 11, wherein the total heating displacement of the current scan is a sum of the displacements in successive movements made by the slot plate during the current scan.

13. A non-transitory computer-readable storage medium with an executable program stored thereon, that when executed, instructs a processor to perform the method of claim 1.

14. The tuning method of claim 1, wherein the driving the slot plate to move in the direction that is opposite to the Z-direction heating displacement amount comprises driving the slot plate to selectively move by a displacement amount that comprises one of (i) the calculated cooling displacement, or (ii) a predetermined displacement that is larger than the calculated cooling displacement, based upon a value of the calculated cooling displacement.

15. The tuning method of claim 14, wherein the slot plate is driven to the predetermined displacement when the calculated cooling displacement is less than the predetermined displacement, and
   wherein the slot plate is driven to the calculated cooling displacement when the calculated cooling displacement is greater than the predetermined displacement.

16. A controller for a collimator of a CT machine, comprising:
   one or more processors; and
   memory storing instructions that, when executed by the one or more processors, configure the controller to:
      determine whether an X-ray is generated from an anode plate;
      calculate a Z-direction heating displacement amount to move a slot plate during a current scan based on a determination of the X-ray being generated;
      control a drive to drive the slot plate to move by the Z-direction heating displacement amount to compensate for displacement of the slot plate in a direction opposite to a Z-direction displacement amount as a result of thermal expansion of the anode plate;
      calculate, based on the determination of the X-ray being generated, a total Z-direction heating displacement of the slot plate at the end of the current scan;
      calculate, based on a stop time of the X-ray, a cooling displacement of the slot plate during a current stop stage by using a linear model that provides a linear relationship between a thermal coefficient of the anode plate and the stop time to predict the cooling displacement of the slot plate; and
      prior to a start of a subsequent scan, control the drive to drive the slot plate to move, based on the calculated cooling displacement, in a direction that is opposite to the Z-direction heating displacement amount.

17. A collimator of a CT machine, comprising a slot plate and a controller as claimed in claim 16.

18. A CT machine comprising: a collimator having a slot plate, and a controller as claimed in claim 16.

* * * * *